United States Patent
Li

(10) Patent No.: US 9,521,311 B2
(45) Date of Patent: Dec. 13, 2016

(54) QUICK AUTOMATIC FOCUSING METHOD AND IMAGE ACQUISITION APPARATUS

(71) Applicant: Huawei Technologies Co., Ltd., Shenzhen (CN)

(72) Inventor: Kai Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/595,655

(22) Filed: Jan. 13, 2015

(65) Prior Publication Data

US 2015/0124155 A1    May 7, 2015

Related U.S. Application Data

(63) Continuation of application No. PCT/CN2013/085437, filed on Oct. 18, 2013.

(30) Foreign Application Priority Data

Mar. 28, 2013   (CN) .......................... 2013 1 0102906

(51) Int. Cl.
*H04N 5/232*   (2006.01)
*G03B 13/36*   (2006.01)

(52) U.S. Cl.
CPC .......... *H04N 5/23212* (2013.01); *G03B 13/36* (2013.01); *H04N 5/23219* (2013.01); *H04N 5/23296* (2013.01)

(58) Field of Classification Search
CPC .... H04N 5/232; H04N 5/2356; H04N 5/2322; H04N 5/23203; H04N 5/23212; H04N 5/23293; G03B 13/36; G03B 13/20
See application file for complete search history.

(56) References Cited

U.S. PATENT DOCUMENTS 4,991,944 A    2/1991   Hirao et al.
5,055,932 A    10/1991  Hijikata
(Continued)

FOREIGN PATENT DOCUMENTS

CN    1837939 A    9/2006
CN    1917585 A    2/2007
(Continued)

OTHER PUBLICATIONS

Foreign Communication From A Counterpart Application, Chinese Application No. 201310102906.X, Chinese Office Action dated Feb. 3, 2015, 7 pages.
(Continued)

*Primary Examiner* — Tuan Ho
(74) *Attorney, Agent, or Firm* — Conley Rose, P.C.

(57) ABSTRACT

A method that includes: detecting, by the image acquisition apparatus, image data of a photographed subject in the case of current photographing parameters, where the photographing parameters include a photographing focal length and a focus, and the image data includes a position of the photographed subject in a formed image and an image size; adjusting the image acquisition apparatus based on the position of the photographed subject in the formed image, so that the position of the photographed subject in the formed image is a first position; determining a target value of the photographing focal length based on a photographing parameter-image data-photographing distance correspondence and according to a current photographing focal length, the image data, and a preset image size; and adjusting a photographing focal length of the image acquisition apparatus to the target value of the photographing focal length.

20 Claims, 8 Drawing Sheets

(56) References Cited

U.S. PATENT DOCUMENTS

| | | | |
|---|---|---|---|
| 8,233,078 | B2 | 7/2012 | Chang |
| 2003/0123865 | A1 | 7/2003 | Hofer et al. |
| 2006/0210257 | A1 | 9/2006 | Yoon |
| 2007/0003267 | A1 | 1/2007 | Shibutani |
| 2008/0252773 | A1* | 10/2008 | Oishi .................. G03B 13/32 348/347 |
| 2009/0015658 | A1 | 1/2009 | Enstad et al. |
| 2009/0059061 | A1 | 3/2009 | Yu et al. |
| 2009/0102942 | A1 | 4/2009 | Yoshizumi et al. |
| 2009/0238549 | A1 | 9/2009 | Kanayama |
| 2009/0322933 | A1 | 12/2009 | Ishii |
| 2010/0040356 | A1 | 2/2010 | Ishikawa |
| 2010/0079623 | A1 | 4/2010 | Tomita |
| 2010/0123782 | A1 | 5/2010 | Yata |
| 2010/0208091 | A1 | 8/2010 | Chang |
| 2010/0226636 | A1 | 9/2010 | Hirai et al. |
| 2010/0272328 | A1 | 10/2010 | Lee |
| 2011/0115945 | A1 | 5/2011 | Takano et al. |
| 2011/0150349 | A1 | 6/2011 | Kojima et al. |
| 2011/0164866 | A1 | 7/2011 | Kayama et al. |
| 2014/0211070 | A1* | 7/2014 | Uchida ................. G03B 13/12 348/333.09 |
| 2014/0354781 | A1* | 12/2014 | Matsuyama ....... H04N 5/23212 348/49 |

FOREIGN PATENT DOCUMENTS

| | | |
|---|---|---|
| CN | 101071252 A | 11/2007 |
| CN | 101378458 A | 3/2009 |
| CN | 201213285 Y | 3/2009 |
| CN | 101415076 A | 4/2009 |
| CN | 101446739 A | 6/2009 |
| CN | 101620360 A | 1/2010 |
| CN | 101785306 A | 7/2010 |
| CN | 102104728 A | 6/2011 |
| CN | 103197491 A | 7/2013 |
| EP | 2051505 A2 | 4/2009 |
| GB | 2271442 A | 4/1994 |
| JP | 2000-098456 * | 4/2000 |
| JP | 2000098456 A | 4/2000 |
| JP | 2008035167 A | 2/2008 |
| JP | 20120198807 A | 10/2012 |

OTHER PUBLICATIONS

Partial English Translation and Abstract of Chinese Patent Application No. CN103197491A, Part 1, Sep. 12, 2014, 54 pages.

Partial English Translation and Abstract of Chinese Patent Application No. CN103197491A, Part 2, Sep. 12, 2014, 11 pages.

Partial English Translation and Abstract of Chinese Patent Application No. CN201213285Y, Nov. 20, 2014, 5 pages.

Foreign Communication From A Counterpart Application, PCT Application No. PCT/CN2013/085437, English Translation of International Search Report dated Jan. 23, 2014, 2 pages.

Foreign Communication From a Counterpart Application, PCT Application No. PCT/CN2013/085437, Written Opinion dated Jan. 23, 2014, 4 pages.

Foreign Communication From A Counterpart Application, European Application No. 13876773.6, Extended European Search Report dated Dec. 23, 2014, 11 pages.

* cited by examiner

QUICK AUTOMATIC FOCUSING METHOD AND IMAGE ACQUISITION APPARATUS

CROSS-REFERENCE TO RELATED APPLICATIONS

This application is a continuation of International Application No. PCT/CN2013/085437, filed on Oct. 18, 2013, which claims priority to Chinese Patent Application No. 201310102906.X, filed on Mar. 28, 2013, both of which are hereby incorporated by reference in their entireties.

TECHNICAL FIELD

The present invention relates to the field of image processing technologies, and in particular, to a quick automatic focusing method and an image acquisition apparatus.

BACKGROUND

In applications of current digital cameras and video cameras, automatic recognition of a photographed subject, especially a human face, and photographing in an automatic focusing manner have been used widely. A human face detection technology is used to locate an accurate position of a human face in a viewfinder frame, and then automatically use the human face as a photographed subject for performing focus detection and performing metering, so as to set an accurate focus and an accurate exposure. However, existing face detection technologies do not take a variation relationship between a human face size and a focal length into consideration, and do not take a variation relationship between the human face size, a photographing distance, a focus, and the focal length into overall consideration either. Consequently, in a photographed picture, the size and a position of the human face cannot be automatically adjusted, and a photographer still needs to shift a position of a camera or a video camera and perform manual focusing to implement the adjustment.

SUMMARY

Embodiments of the present invention provide a quick automatic focusing method and an image acquisition apparatus to implement photographing in a manner of automatic focal length adjustment and focusing, so as to automatically display a photographed image in an appropriate size.

According to a first aspect, an embodiment of the present invention provides a quick automatic focusing method, where the method includes detecting, by an image acquisition apparatus, image data of a photographed subject in the case of current photographing parameters, where the photographing parameters include a photographing focal length and a focus, and the image data includes a position of the photographed subject in a formed image and an image sizebased on the position of the photographed subject in the formed image, adjusting the image acquisition apparatus so that the position of the photographed subject in the formed image is a first position; determining a target value of the photographing focal length based on a photographing parameter-image data-photographing distance correspondence and according to a current photographing focal length, the image data, and a preset image size; and adjusting a photographing focal length of the image acquisition apparatus to the target value of the photographing focal length.

According to a second aspect, an embodiment of the present invention provides an image acquisition apparatus, where the apparatus includes a lens, a data collection module, a lens pointing control module, a processing module, a focal length control module, a focus control module, and a storage module, where the lens includes a focal length lens group and a focus lens group; the data collection module is configured to obtain image data of a photographed subject and current photographing parameters, where the photographing parameters include a photographing focal length and a focus, and the image data includes a position of the photographed subject in a formed image and an image size; the lens pointing control module is configured to adjust the image acquisition apparatus so that the position of the photographed subject in the formed image is a first position; the processing module is configured to determine a target value of the photographing focal length according to the current photographing focal length and the image data that are obtained by the data collection module and according to a preset image size, and determine a target value of a focus position according to the target value of the photographing focal length; the focal length control module is configured to adjust the focal length lens group so that a photographing focal length of the image acquisition apparatus is the target value of the photographing focal length; the focus control module is configured to adjust the focus lens group so that a focus of the image acquisition apparatus is the target value of the focus position; and the storage module is configured to store a photographing parameter-image data-photographing distance correspondence and the preset image size.

In a quick automatic focusing method and an image acquisition apparatus provided in embodiments of the present invention, photographing in a manner of quick automatic focal length adjustment and focusing is implemented according to obtained image data and photographing parameters of a photographed subject, so as to implement automatic adjustment of the image data and display an image in an appropriate size.

The following further describes the technical solutions in the embodiments of the present invention in detail using accompanying drawings and embodiments.

DESCRIPTION OF EMBODIMENTS

Figure 1:
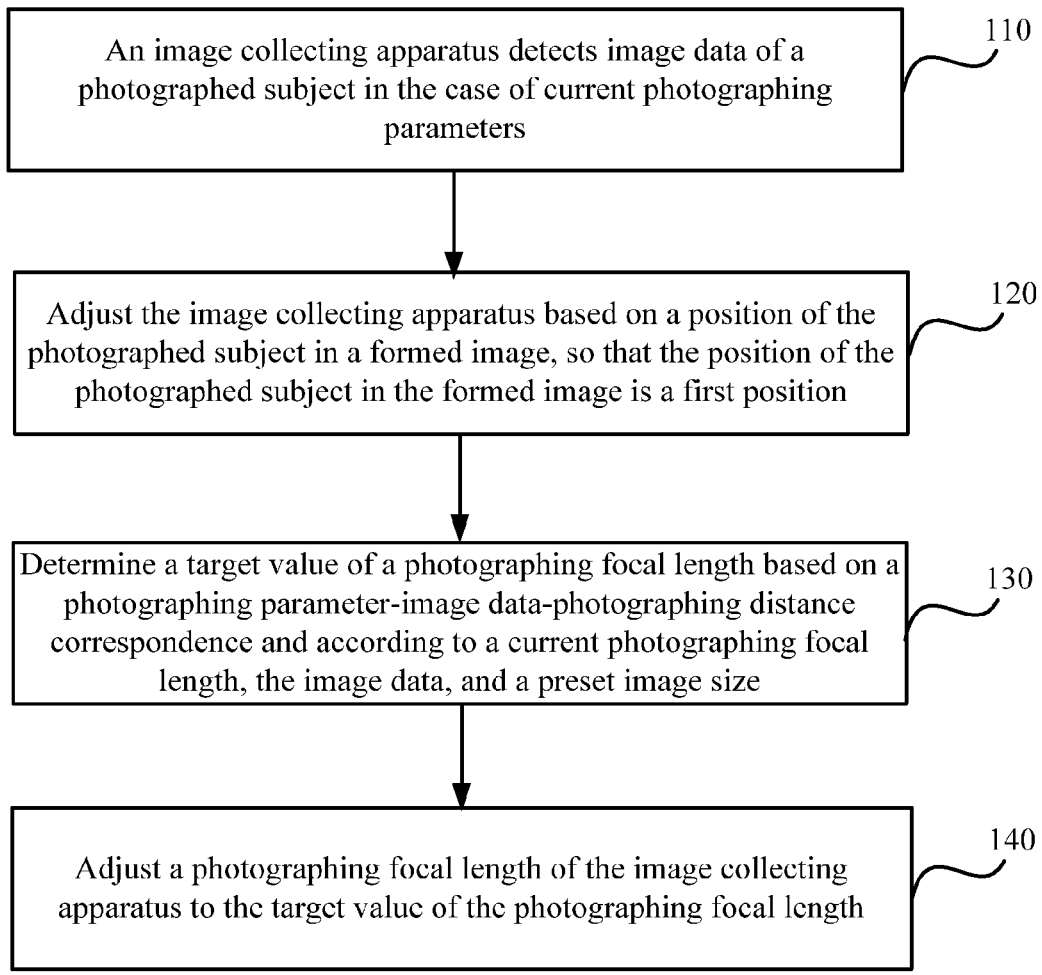
FIG. 1 is a flowchart of an automatic focusing method according to an embodiment of the present invention.
Figure 2A:
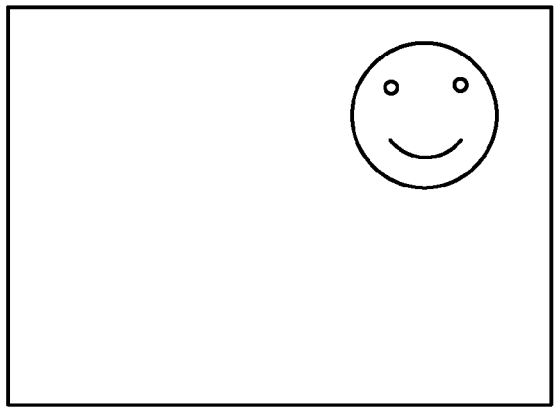
FIG. 2A is a first schematic display diagram of an automatic focusing method according to an embodiment of the present invention.
Figure 2B:
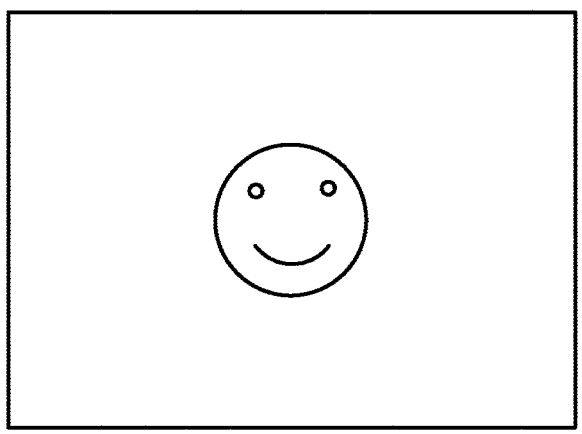
FIG. 2B is a second schematic display diagram of an automatic focusing method according to an embodiment of the present invention.
Figure 2C:
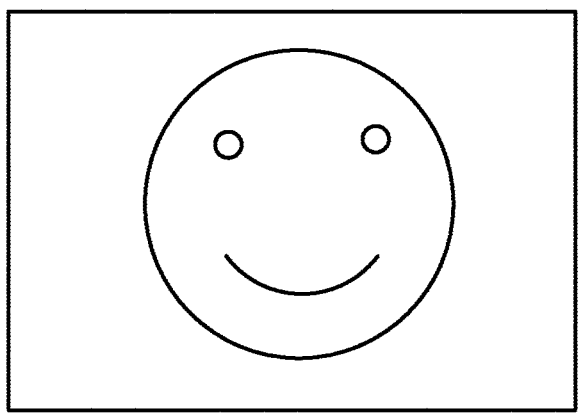
FIG. 2C is a third schematic display diagram of an automatic focusing method according to an embodiment of the present invention.

FIG. 1 is a flowchart of an automatic focusing method according to an embodiment of the present invention. FIGS. 2A to 2C are schematic display diagrams of an automatic focusing method according to an embodiment of the present invention. The following describes the embodiment of the present invention in detail with reference to FIG. 1 and FIG. 2A to FIG. 2C. As shown in FIG. 1, the embodiment includes the following steps.

Step 110: An image acquisition apparatus detects image data of a photographed subject in the case of current photographing parameters.

Further, the image acquisition apparatus photographs the photographed subject in the case of the current photographing parameters, and obtains the image data of the photographed subject by means of photographing. The photographing parameters include a photographing focal length and a focus, and the image data includes a position of the photographed subject in a formed image and an image size.

The photographed subject in the image acquisition apparatus is shown in FIG. 2A.

Step 120: Adjust the image acquisition apparatus based on a position of the photographed subject in a formed image, so that the position of the photographed subject in the formed image is a first position.

Further, the image acquisition apparatus analyzes the image data obtained by photographing, determines an image formation position of the image in the image acquisition apparatus, generates corresponding lens pointing adjustment data according to a position difference between a central position of the image and a first position on a display screen of the image acquisition apparatus or a display externally connected to the image acquisition apparatus, and drives the image acquisition apparatus to adjust, by means of rotation, a pointing position, so that the image is formed in the first position. Preferably, the first position is a central point position of the display screen. In this case, the photographed subject in the image acquisition apparatus is shown in FIG. 2B.

Step 130: Determine a target value of a photographing focal length based on a photographing parameter-image data-photographing distance correspondence and according to a current photographing focal length, the image data, and a preset image size.

Further, according to the current photographing focal length and the image data that is obtained by means of photographing using the current photographing focal length, an object distance between the current photographed subject and the image acquisition apparatus is obtained from the photographing parameter-image data-photographing distance correspondence that is preset in a memory of the image acquisition apparatus. The memory also stores the preset image size. Further, the target value of the photographing focal length is obtained from the foregoing correspondence according to the preset image size and the foregoing object distance.

Step 140: Adjust a photographing focal length of the image acquisition apparatus to the target value of the photographing focal length.

Further, the photographing focal length is adjusted from the current photographing focal length to the target value of the photographing focal length. In this case, as shown in FIG. 2C, an image of the photographed subject, that is, a human face, is displayed on a screen in the preset image size.

By applying the quick automatic focusing method provided in this embodiment of the present invention, quick automatic focal length adjustment is implemented according to obtained image data and photographing parameters of a photographed subject, so as to implement automatic adjustment of the image data and display an image in an appropriate size.

Figure 3:
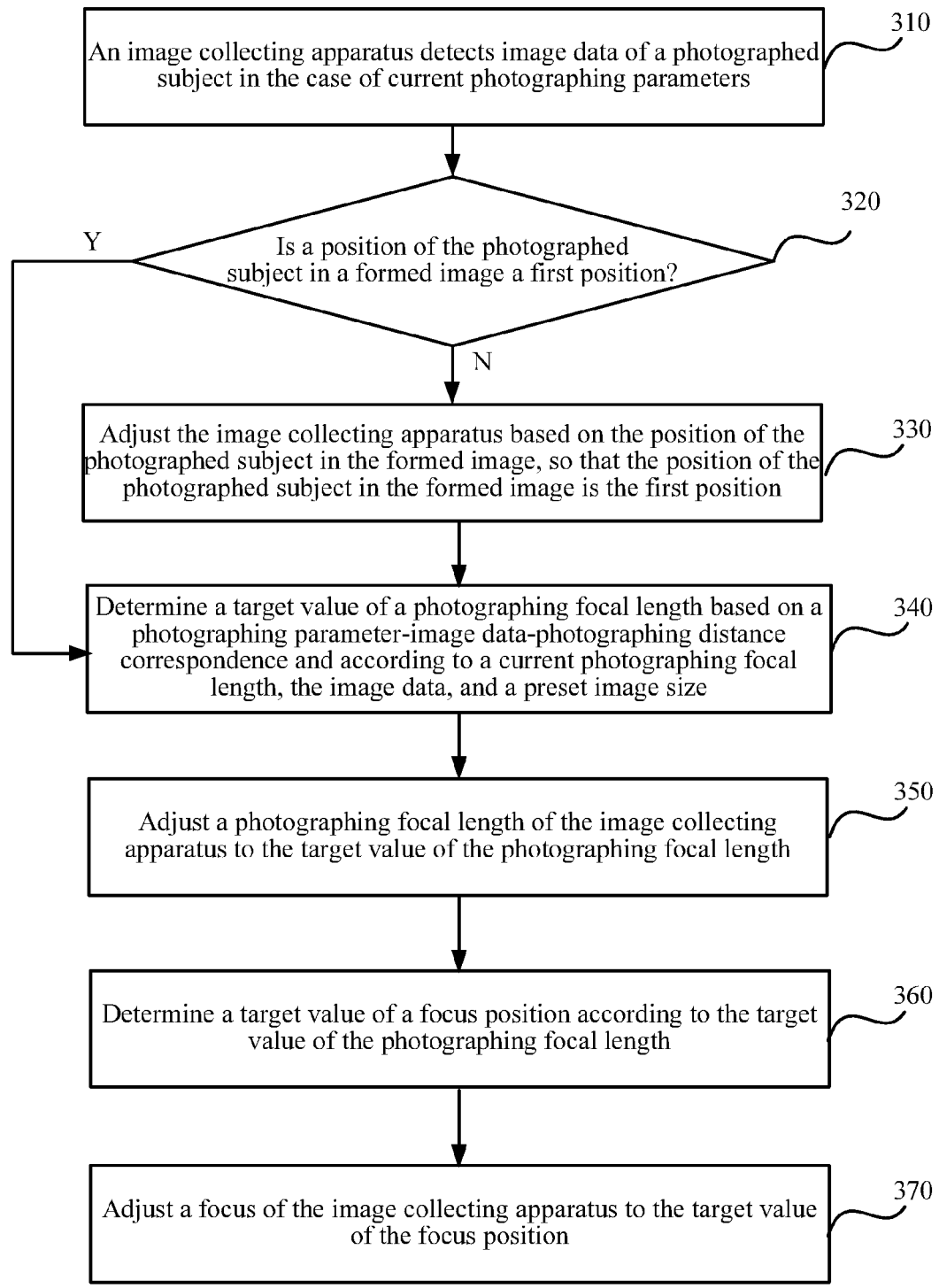
FIG. 3 is a flowchart of another automatic focusing method according to an embodiment of the present invention.

FIG. 3 is a flowchart of an automatic focusing method according to an embodiment of the present invention. As shown in FIG. 3, this embodiment includes the following steps.

Step 310: An image acquisition apparatus detects image data of a photographed subject in the case of current photographing parameters.

Further, the image acquisition apparatus photographs the photographed subject in the case of the current photographing parameters, and obtains the image data of the photographed subject by means of photographing. The photographing parameters include a photographing focal length and a focus, and the image data includes a position of the photographed subject in a formed image and an image size.

Step 320: Determine whether a position of the photographed subject in a formed image is a first position.

Further, when the position of the photographed subject in the formed image is the first position, skip the following step 330 and execute step 340 directly, where step 330 is a step of adjusting the image acquisition apparatus so that the position of the photographed subject in the formed image is the first position. If the position of the photographed subject in the formed image is not the first position, execute step 330.

Step 330: Adjust the image acquisition apparatus based on the position of the photographed subject in the formed image, so that the position of the photographed subject in the formed image is the first position.

Step 340: Determine a target value of a photographing focal length based on a photographing parameter-image data-photographing distance correspondence and according to a current photographing focal length, the image data, and a preset image size.

Step 350: Adjust a photographing focal length of the image acquisition apparatus to the target value of the photographing focal length.

The foregoing steps 330 to 350 are the same as the foregoing steps 120 to 140, and details are not described herein again.

Step 360: Determine a target value of a focus position according to the target value of the photographing focal length.

Further, the corresponding focus, that is, the target value of the focus position, is searched out in the known photographing parameter-image data-photographing distance correspondence according to the target value of the photographing focal length and the foregoing object distance.

Step 370: Adjust a focus of the image acquisition apparatus to the target value of the focus position.

Further, the focus is adjusted to the target value of the focus position that is obtained in step 360, so that the image obtained by the image acquisition apparatus is displayed clearly.

Preferably, automatic focus fine adjustment is performed after step 370 so that a best image display effect may be obtained.

Preferably, the method for obtaining the target value of the focus position using the target value of the photographing focal length in steps 360 and 370 may further be replaced by a focus following method. The focus following method is, in a process of adjusting the photographing focal length of the image acquisition apparatus to the target value of the photographing focal length, the focus automatically varies continuously with a continuous variation in the photographing focal length.

By applying the quick automatic focusing method provided in this embodiment of the present invention, photographing in a manner of quick automatic focal length adjustment and focusing is implemented according to obtained image data and photographing parameters of a photographed subject, so as to implement automatic adjustment of the image data and display an image clearly in an appropriate size.

The foregoing method in this embodiment of the present invention is generally combined with a human face recognition technology, and is applied to human face photographing. Therefore, in a process of establishing a photographing parameter-image data-photographing distance correspondence, the correspondence is preferably established using a human face or a reference object in a size similar to that of a human face as a photographed subject.

When this method is used to photograph a subject that greatly differs from a human face in size, the method provided in the foregoing embodiment may be revised in the following way, so as to adjust the focal length more precisely for photographing.

In an example, in a process of establishing the photographing parameter-image data-photographing distance correspondence, the photographed subject is a reference object A; and a mapping relationship between a photographing focal length of the reference object A and that of an object B of a different size may be preconfigured in the image acquisition apparatus. In a photographing process, a user may estimate, and, by means of a manually configurable option, select a multiple relationship between a size of a currently photographed object and that of the reference object A. According to the multiple relationship and the mapping relationship, the image acquisition apparatus obtains a corresponding photographing focal length, so as to implement precise focal length adjustment for objects of different sizes and perform photographing.

The following describes in detail an implementation process of a method for obtaining the photographing parameter-image data-photographing distance correspondence in the foregoing two embodiments with reference to FIG. 4 to FIG. 7.

The photographing parameter-image data-photographing distance correspondence is already determined in a process of producing an image acquisition apparatus, and is stored in the data collecting apparatus.

Photographing parameters may include information such as a photographing focal length and a focus, image data includes a position of a photographed subject in a formed image and an image size, and a photographing distance is a distance between the photographed subject and the image acquisition apparatus. Preferably, the image of the photographed subject is a human face image.

The photographing parameter-image data-photographing distance correspondence may include a correspondence between the photographing focal length and a size of the human face image, a correspondence between the size of the human face image and the photographing distance, a correspondence between the photographing focal length and the photographing distance, a correspondence between the photographing focal length and the focus, and the like.

Figure 4:
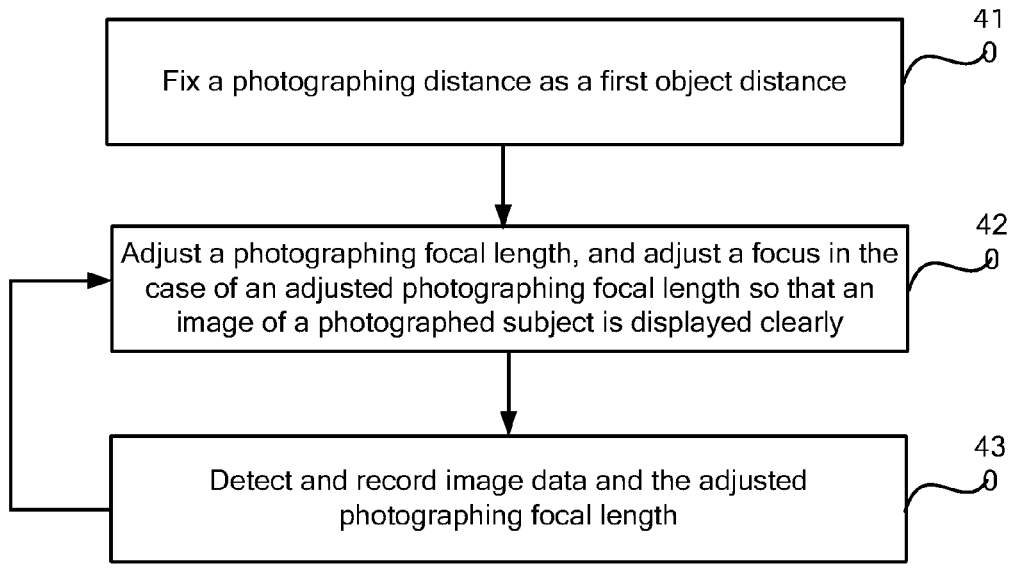
FIG. 4 is a flowchart of a method for determining a photographing parameter-image data-photographing distance correspondence according to an embodiment of the present invention.

FIG. 4 is a flowchart of a method for determining a photographing parameter-image data-photographing distance correspondence according to an embodiment of the present invention. As shown in FIG. 4, this embodiment includes the following steps.

Step 410: Fix a photographing distance as a first object distance.

Further, a photographed subject stands still in a position that is set in front of an image acquisition apparatus and a distance between the photographed subject and the image acquisition apparatus is recorded as the first object distance.

Step 420: Adjust a photographing focal length, and adjust a focus in the case of an adjusted photographing focal length so that an image of a photographed subject is displayed clearly.

Further, a minimum focal length at a wide-angle end of the image acquisition apparatus is set as an initial photographing focal length. The photographing focal length is adjusted from the wide-angle end to a telephoto end, and preferably, is adjusted by one step length unit each time. In the case of the adjusted photographing focal length, the focus is adjusted manually until a human face image is the clearest.

Step 430: Detect and record image data and the adjusted photographing focal length.

Further, a size of the human face image in the case of the adjusted photographing focal length is detected, and the photographing focal length and human face size information are recorded.

Steps 420 to 430 are executed cyclically until the photographing focal length reaches or exceeds a maximum focal length adjustment range.

By applying the method provided in this embodiment of the present invention, a correspondence between a focal length and a human face image size may be obtained.

Figure 5:
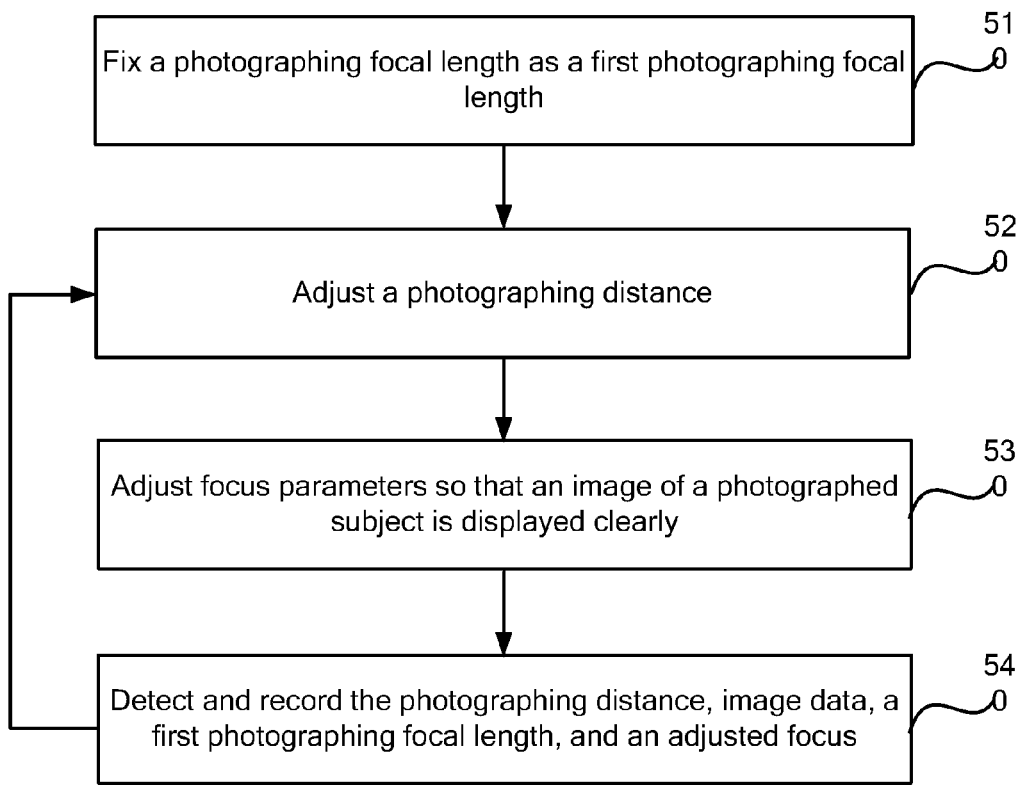
FIG. 5 is a flowchart of another method for determining a photographing parameter-image data-photographing distance correspondence according to an embodiment of the present invention.

FIG. 5 is a flowchart of another method for determining a photographing parameter-image data-photographing distance correspondence according to an embodiment of the present invention. As shown in FIG. 5, this embodiment includes the following steps.

Step 510: Fix a photographing focal length as a first photographing focal length.

Further, the photographing focal length is adjusted manually, the photographing focal length is fixed at a fixed value, and the value of the photographing focal length does not change throughout a subsequent adjustment process.

Step 520: Adjust a photographing distance.

Further, a plurality of photographing points is set from far to near in front of an image acquisition apparatus, a photographed subject stands in a set position and moves toward the image acquisition apparatus by one photographing point for each adjustment, and a distance between a person and the image acquisition apparatus in the case of current photographing is measured.

Step 530: Adjust a focus so that an image of a photographed subject is displayed clearly.

Further, the focus of the image acquisition apparatus is adjusted manually until the displayed image is the clearest.

Step 540: Detect and record the photographing distance, image data, a first photographing focal length, and an adjusted focus.

Further, a size of a human face image in the case of a current photographing focal length is detected, and a distance between the photographed subject and the image acquisition apparatus in a current state, the size of the human face image, and a current focus are recorded, so as to establish a photographing distance-face size-focus correspondence.

Steps 520 to 540 are executed cyclically until the photographed subject moves to a photographing point closest to the image acquisition apparatus.

By applying the method provided in this embodiment of the present invention, a photographing distance-face size-focus correspondence may be obtained.

Figure 6:
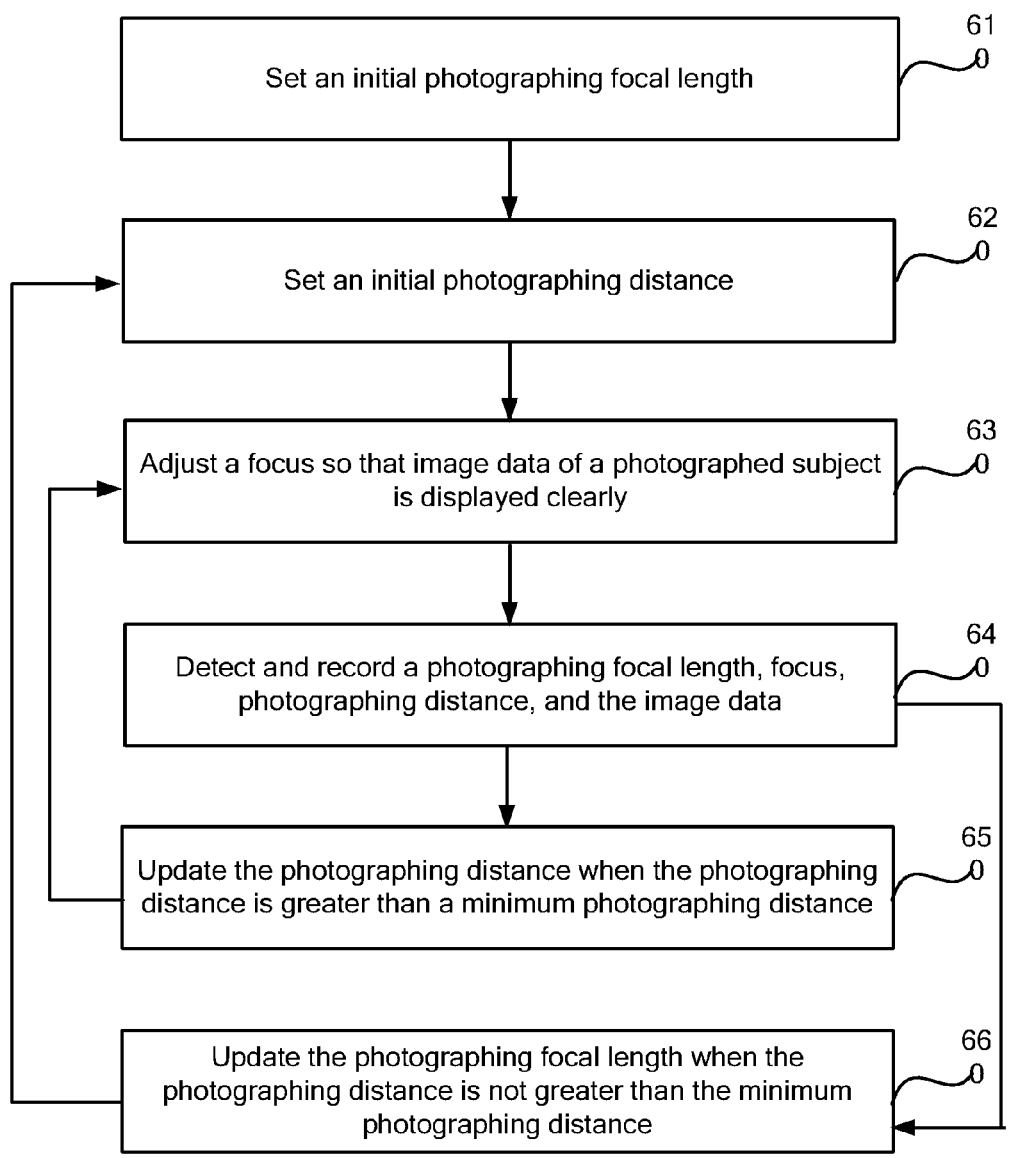
FIG. 6 is a flowchart of a third method for determining a photographing parameter-image data-photographing distance correspondence according to an embodiment of the present invention.

FIG. 6 is a flowchart of a third method for determining a photographing parameter-image data-photographing distance correspondence according to an embodiment of the present invention. The method provided in this embodiment combines the two methods shown in FIG. 4 and FIG. 5. As shown in FIG. 6, this embodiment includes the following steps.

Step 610: Set an initial photographing focal length.

Further, a minimum focal length at a wide-angle end of an image acquisition device is set as the initial photographing focal length.

Step 620: Set an initial photographing distance.

Further, a plurality of photographing points is set from far to near in front of an image acquisition apparatus. In an initial state, a photographed subject stands in a position that is set at the farthest end, and a distance between the photographed subject and the image acquisition apparatus is measured.

Step 630: Adjust a focus so that an image of a photographed subject is displayed clearly.

Further, the focus is adjusted manually until a displayed image of the photographed subject is the clearest.

Step 640: Detect and record a current photographing focal length, focus, and photographing distance, and current image data.

Further, a size of a human face image in the case of the current photographing focal length and photographing distance is detected, and a distance between a person and the image acquisition apparatus in a current state, the size of the human face image, the current photographing focal length, and the current focus are recorded, so as to establish a photographing distance-face size-focus-photographing focal length correspondence.

Step 650: Update the photographing distance when the photographing distance is greater than a minimum photographing distance.

Further, when the photographing distance is greater than the minimum photographing distance, the photographed subject moves toward the image acquisition apparatus by one photographing point. The distance between the person and the image acquisition apparatus in the case of current photographing is measured.

Steps 630 to 650 are executed cyclically until the photographed subject moves to a photographing point closest to the image acquisition apparatus.

Step 660: Update the photographing focal length when the photographing distance is not greater than the minimum photographing distance.

Further, when the photographing distance is less than or equal to the minimum photographing distance, the photographing focal length is adjusted from a wide-angle end to a telephoto end, and preferably, is adjusted by one step length unit each time.

Steps 620 to 660 are executed cyclically until an adjusted photographing focal length exceeds a maximum focal length at the telephoto end of the image acquisition apparatus.

By applying the method provided in this embodiment of the present invention, a photographing distance-face size-focus-photographing focal length correspondence may be obtained. Preferably, the foregoing correspondence may be stored in the image acquisition apparatus in the form of a comparison table.

Figure 7:
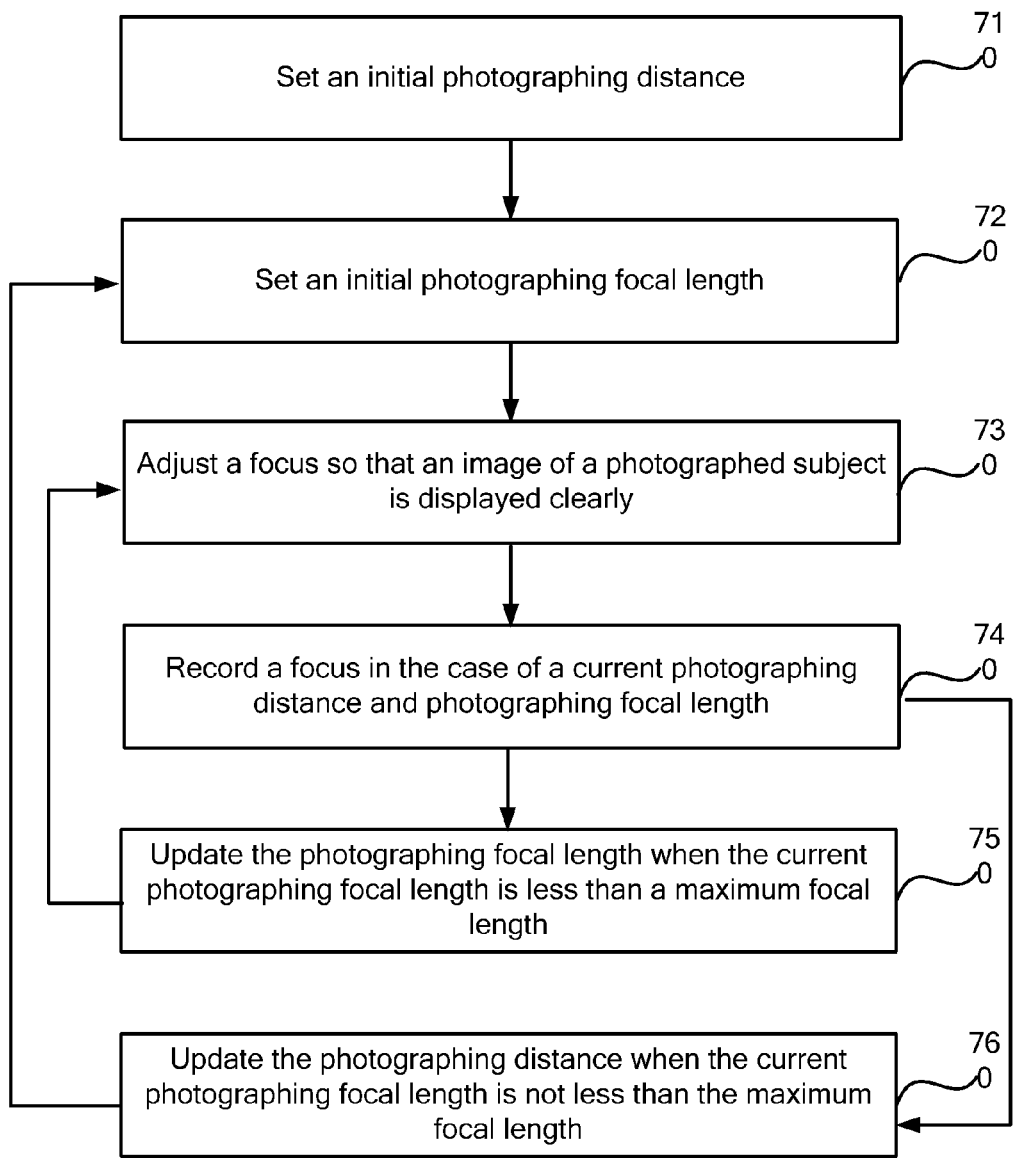
FIG. 7 is a flowchart of a fourth method for determining a photographing parameter-image data-photographing distance correspondence according to an embodiment of the present invention.

FIG. 7 is a flowchart of a fourth method for determining a photographing parameter-image data-photographing distance correspondence according to an embodiment of the present invention. In this method, a photographed subject is a sharpness test card, which is used to determine a more accurate focus in the case of a corresponding photographing focal length. As shown in FIG. 7, this embodiment includes the following steps.

Step 710: Set an initial photographing distance.

Further, a plurality of photographing points is set from far to near in front of an image acquisition apparatus. In an initial state, the sharpness test card is placed at a photographing point at the farthest end, and a distance between the sharpness test card and the image acquisition apparatus in the case of current photographing is measured.

Step 720: Set an initial photographing focal length.

Further, a minimum focal length at a wide-angle end of an image acquisition device is set as the initial photographing focal length.

Step 730: Adjust a focus so that an image of a photographed subject is displayed clearly.

Further, a focus of the image acquisition apparatus is adjusted in the case of a current photographing focal length until a displayed image of the photographed subject is the clearest.

Step 740: Record a focus in the case of a current photographing distance and photographing focal length.

Further, the current photographing distance, the current photographing focal length, and the focus in the case of the current photographing focal length are recorded, so as to obtain a correspondence between the photographing focal length and the focus in the case of a current position.

Step 750: Update the photographing focal length when the current photographing focal length is less than a maximum focal length.

Further, the photographing focal length is updated and adjusted when the current photographing focal length is less than the maximum focal length. Preferably, when a settings update occurs, a settings update of the photographing focal length complies with adjustment from a wide-angle end to a telephoto end and one step length unit for each adjustment.

Steps 730 to 750 are executed cyclically until the photographing focal length reaches a maximum focal length at the telephoto end.

Step 760: Update the photographing distance when the current photographing focal length is not less than the maximum focal length.

Further, the photographing distance is updated and adjusted when the photographing focal length reaches the maximum focal length at the telephoto end. Preferably, for each adjustment, the sharpness test card is moved toward the image acquisition apparatus by one photographing point, and a distance between the sharpness test card and the image acquisition apparatus in the case of current photographing is measured. Steps 720 to 760 are executed cyclically until the sharpness test card is moved to a last photographing point.

By applying the method provided in this embodiment of the present invention and using a correspondence between a focus and a photographing focal length in the case of a fixed photographing distance, it may be implemented that, in a focal length variation process in the methods provided in FIG. 1 and FIG. 3, the focus always automatically varies with a variation in the focal length and automatic focusing is always maintained. That is, image clarity is ensured throughout a zooming process. Preferably, the correspondence obtained using the foregoing method may be stored in the image acquisition apparatus in the form of a comparison table.

Figure 8:
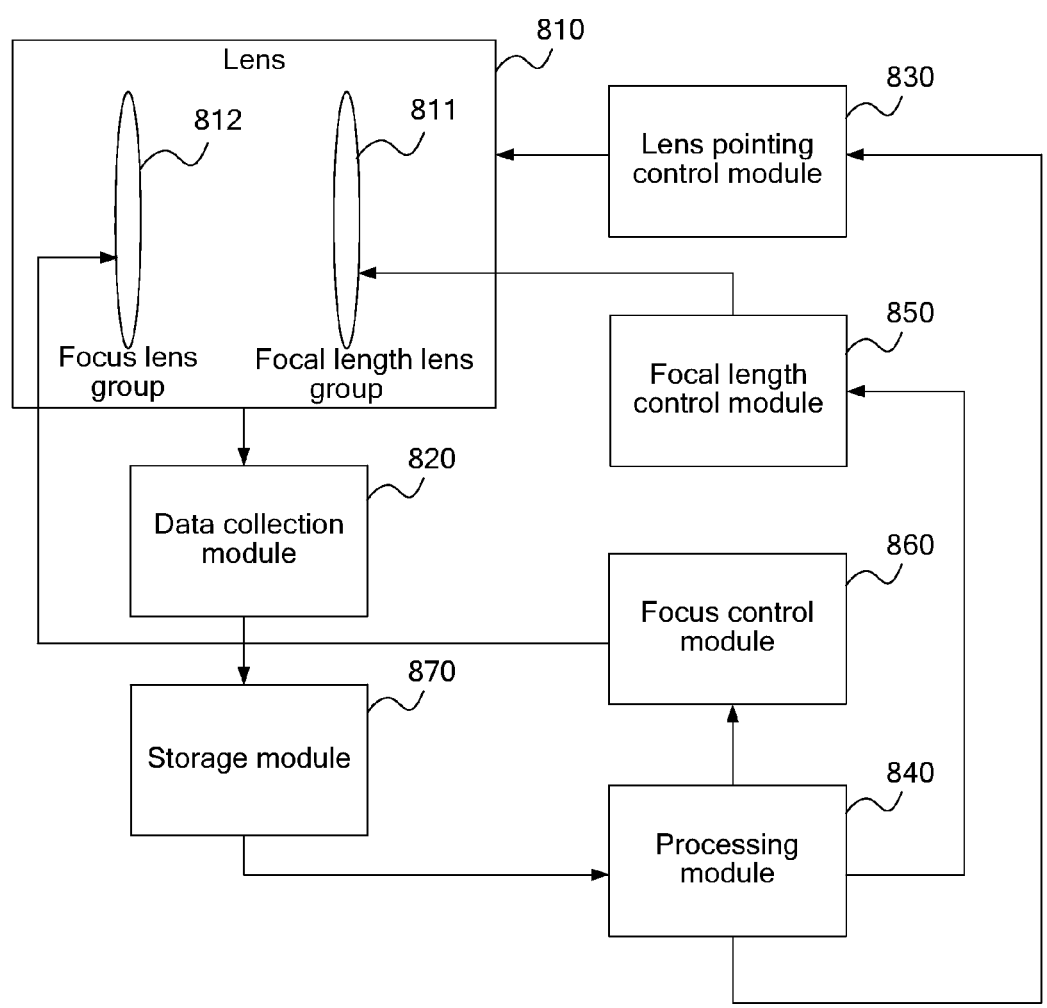
FIG. 8 is a schematic diagram of an image acquisition apparatus according to an embodiment of the present invention.

An embodiment of the present invention further provides an image acquisition apparatus, which may implement a quick automatic focusing method provided in the foregoing embodiments. FIG. 8 is a schematic diagram of an image acquisition apparatus according to an embodiment of the present invention. As shown in the figure, the image acquisition apparatus includes a lens 810, a data collection module 820, a lens pointing control module 830, a processing module 840, a focal length control module 850, a focus control module 860, and a storage module 870.

The lens 810 includes a focal length lens group 811 and a focus lens group 812.

The data collection module 820 is configured to obtain current photographing parameters and image data of a photographed subject, where the photographing parameters include a photographing focal length and a focus, and the image data includes a position of the photographed subject in a formed image and an image size.

The lens pointing control module 830 is configured to adjust an angle of the image acquisition apparatus so that the position of the photographed subject in the formed image is a first position.

The processing module 840 is configured to determine a target value of the photographing focal length according to the current photographing focal length and the image data that are obtained by the data collection module 830 and according to a preset image size, and determine a target value of a focus position according to the target value of the photographing focal length.

The focal length control module 850 is configured to adjust the focal length lens group 811 so that a focal length of the image acquisition apparatus is the target value of the photographing focal length.

The focus control module 860 is configured to adjust the focus lens group 812 so that a focus of the image acquisition apparatus is the target value of the focus position.

The storage module 870 is configured to store a photographing parameter-image data-photographing distance correspondence and the preset image size.

The foregoing outlines functions of each part of the image acquisition apparatus, and the following describes a working process of the image acquisition apparatus in detail.

After a user enables an automatic focusing mode of the image acquisition apparatus, the data collection module 820 uses the lens 810 to photograph the photographed subject. In this case, the image acquisition apparatus implements automatic focusing by automatically adjusting the focus lens group 811, so that a photographed human face image is displayed clearly. The data collection module 820 separately transmits the obtained current photographing focal length and human face image to the storage module 870 for storing.

The processing module 840 reads information about the human face image from the storage module 870, recognizes a position difference between a current display position of the human face image and a central point position of a screen, calculates data of angles of horizontal adjustment and vertical adjustment required of the lens 810 in order to centrally display the human face image, and transmits the data to the lens pointing control module 830, so that the lens 810 rotates by a corresponding angle to centrally display the human face image.

The processing module 840 reads the stored photographing focal length and human face image from the storage module 870, and obtains a corresponding photographing distance according to the photographing parameter-image data-photographing distance correspondence stored in the storage module 870. The storage module 870 also stores the preset image size, where the preset image size refers to an appropriate human face image size that is suitable for displaying. The processing module 840 obtains the preset image size; obtains, according to the photographing distance obtained in the preceding step and by means of correspondence in the storage module 870, a photographing focal length required for displaying the human face image in the preset image size; and obtains a corresponding focus.

The processing module 840 transmits the photographing focal length to the focal length control module 850, and the focal length control module 850 adjusts a position of the focal length lens group 811 so that the image acquisition apparatus perform image photographing at this focal length. In addition, the processing module 840 transmits the focus to the focus control module 860, and the focus control module 860 adjusts a position of the focus lens group 812 so that the image acquisition apparatus uses this focus to perform image photographing.

In a use process, the user only needs to enable the automatic focusing mode of the image acquisition apparatus; or in some application scenarios such as a camera in a fixed position in a video conference, startup in the automatic focusing mode may be set directly without requiring the user to further perform any operations. In this way, the image acquisition apparatus can quickly and automatically complete a focal length adjustment and focusing process, and a clear human face image is displayed in the preset image size.

Figure 9:
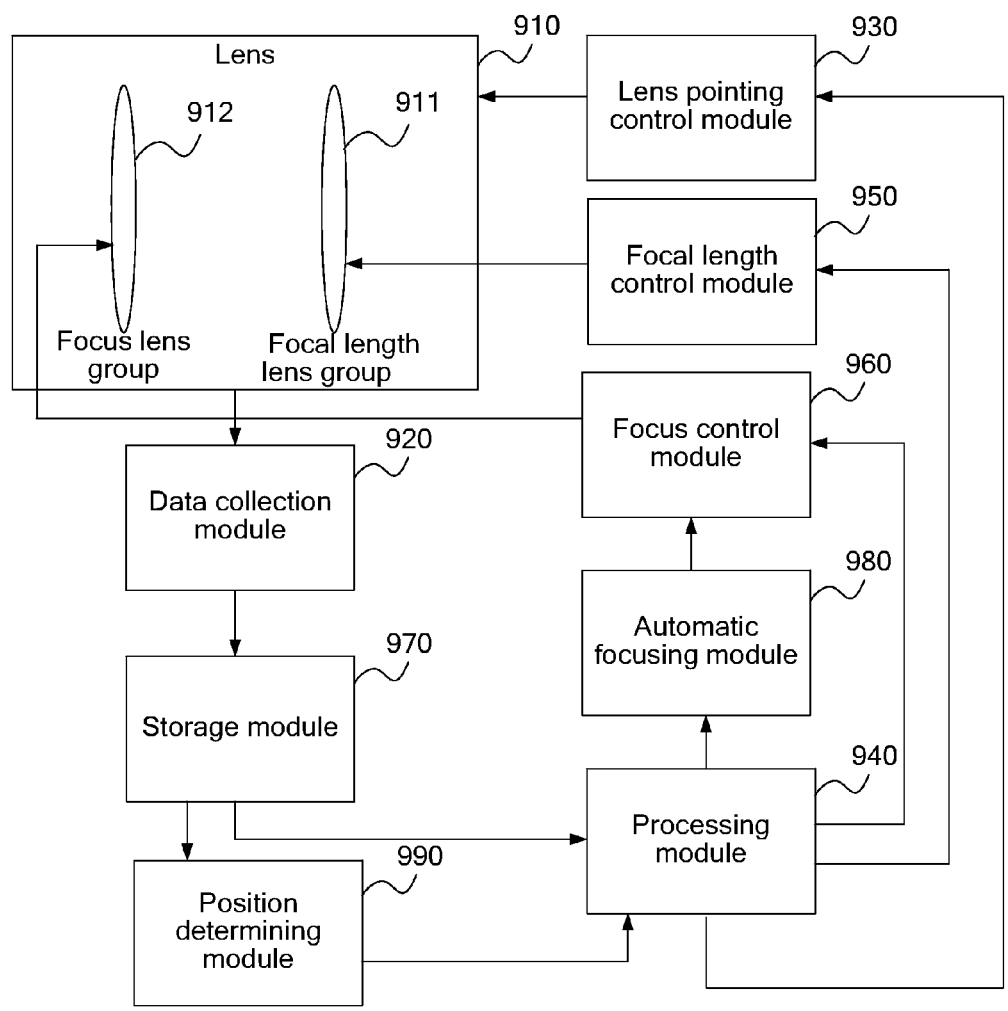
FIG. 9 is a schematic diagram of another image acquisition apparatus according to an embodiment of the present invention.

In a preferred embodiment, as shown in FIG. 9, an image acquisition apparatus includes a lens 910, a data collection module 920, a lens pointing control module 930, a processing module 940, a focal length control module 950, a focus control module 960, and a storage module 970. In addition, the image acquisition apparatus further includes an automatic focusing module 980 and a position determining module 990.

The automatic focusing module 980 is connected between the processing module 940 and the focus control module 960, and is configured to enable a focus to vary continuously with a continuous variation in a focal length, so that an image can retain a clear focus throughout a zooming process.

The position determining module 990 obtains a position of a photographed subject in a formed image from the storage module 970, determines whether the position of the photographed subject in the formed image is a first position, and sends a result of determining to the processing module 940, so that the processing module 940 determines whether to control the lens pointing control module 930 to adjust a photographing angle of the image acquisition apparatus.

When this apparatus is used to photograph a subject that greatly differs from a human face in size, a mapping relationship between a photographing focal length of a reference object A and that of an object B of a different size is preconfigured in the storage module 970, where the reference object A is a photographed subject when a photographing parameter-image data-photographing distance correspondence is established; the data collection module 920 obtains and sends to the processing 940, a size relationship between the currently photographed object and the reference object A, which is estimated and selected by means of manual configuration by a user; according to the multiple relationship, the processing module 940 obtains a corresponding photographing focal length from the mapping relationship in the storage module 970, so as to implement precise focal length adjustment for objects of different sizes and perform photographing.

All the foregoing embodiments are based on a human face recognition technology, and use an example of a focus area in which a photographed subject is one human face. In the case of photographing a plurality of human faces, a predefined selection method may be used to select one or more appropriate human faces as an area for further focusing.

A person skilled in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

Steps of methods or algorithms described in the embodiments disclosed in this specification may be implemented by hardware, a software module executed by a processor, or a combination thereof. The software module may be configured in a random access memory (RAM), a memory, a read-only memory (ROM), an electrically programmable ROM, an electrically erasable programmable ROM, a register, a hard disk, a removable disk, a CD-ROM (compact disk), or a storage medium in any other forms well-known in the art.

In the foregoing implementation manners, the objectives, technical solutions, and benefits of the present invention are further described in detail. It should be understood that the foregoing descriptions are merely specific implementation manners of the present invention, but are not intended to limit the protection scope of present invention. Any modification, equivalent replacement, or improvement made without departing from the spirit and principle of the present invention shall fall within the protection scope of the present invention.

What is claimed is:

1. A quick automatic focusing method comprising:
   detecting, by an image acquisition apparatus, image data of a photographed subject following current photographing parameters, wherein the current photographing parameters comprise a photographing focal length, and wherein the image data comprises a position of the photographed subject in a formed image and an image size;
   adjusting the image acquisition apparatus such that the position of the photographed subject in the formed image is a first position based on the position of the photographed subject in the formed image;
   determining a target value of the photographing focal length based on a photographing parameter-image data-photogaphing distance correspondence and according to a current photographing focal length, the image data, and a preset image size;
   adjusting the current photographing focal length of the image acquisition apparatus to the target value of the photographing focal length, wherein a focus automatically varies continuously with a continuous variation in the photographing focal length.

2. The method according to claim 1 further comprising:
   determining a target value of a focus position according to the target value of the photographing focal length; and
   adjusting a focus of the image acquisition apparatus to the target value of the focus position.

3. The method according to claim 1, further comprising determining the photographing parameter-image data-photographing distance correspondence, wherein determining the photographing parameter-image data-photographing distance correspondence comprises:
   fixing a photographing distance as a first object distance;
   adjusting the current photographing focal length;
   adjusting the focus such that an image of the photographed subject is displayed clearly; and
   detecting and recording the image data and the adjusted photographing focal length.

4. The method according to claim 1, further comprising determining the photographing parameter-image data-photographing distance correspondence, wherein determining the photographing parameter-image data-photographing distance correspondence comprises:
   fixing the photographing focal length as a first photographing focal length;
   adjusting a photographing distance;
   adjusting the focus such that an image of the photographed subject is displayed clearly; and
   detecting and recording the photographing distance, the image data, the first photographing focal length, and the adjusted focus.

5. The method according to claim 1, further comprising determining the photographing parameter-image data-photographing distance correspondence, wherein determining the photographing parameter-image data-photographing distance correspondence comprises:
   setting an initial photographing focal length;
   setting an initial photographing distance;
   adjusting the focus such that an image of the photographed subject is displayed clearly;
   detecting and recording the current photographing focal length, the focus, a photographing distance, and the image data; and
   updating the photographing distance when the photographing distance is greater than a minimum photographing distance.

6. The method according to claim 5, wherein the photographing focal length is updated when the photographing distance is not greater than the minimum photographing distance.

7. The method according to claim 1, further comprising determining the photographing parameter-image data-photographing distance, wherein determining the photographing parameter-image data-photographing distance correspondence comprises:
   setting an initial photographing distance;
   setting an initial photographing focal length;

adjusting the focus such that an image of the photographed subject is displayed clearly;
recording the focus; and
updating the photographing focal length when the current photographing focal length is less than a maximum focal length.

8. The method according to claim 7, wherein the photographing distance is updated when the current photographing focal length is not less than the maximum focal length.

9. The method according to claim 1, wherein determining the target value of the photographing focal length according to the current photographing focal length, the image data, and the preset image size comprises:
determining a photographing distance between the photographed subject and the image acquisition apparatus according to the current photographing focal length, the image size, and the photographing parameter-image data-photographing distance correspondence; and
determining the target value of the photographing focal length according to the preset image size, the photographing distance, and the photographing parameter-image data-photographing distance correspondence.

10. The method according to claim 1, wherein before adjusting the image acquisition apparatus such that the position of the photographed subject in the formed image is a first position, the method further comprises:
determining whether the position of the photographed subject in the formed image is the first position; and
skipping adjusting the image acquisition apparatus when the position in the image is the first position such that the position of the photographed subject in the formed image is the first position.

11. An image acquisition apparatus comprising:
a lens comprising focal length lens group and a focus lens group;
a processor coupled to the lens; and
memory coupled to the processor and configured to store a photographing parameter-image data-photographing distance correspondence and a preset image size,
wherein the processor is configured to:
obtain image data of a photographed subject and current photographing parameters, wherein the current photographing parameters comprise a photographing focal length and a focus, wherein the image data comprises a position of the photographed subject in a formed image and an image size, wherein the image acquisition apparatus is adjusted such that the position of the photographed subject in the formed image is a first position;
determine a target value of the photographing focal length according to the current photographing focal length, the image data, and the preset image size, wherein the focal length lens group is adjusted such that the current photographing focal length of the image acquisition apparatus is the target value of the photographing focal length; and
determine a target value of a focus position according to the target value of the photographing focal length, wherein the focus lens group is adjusted such that a focus of the image acquisition apparatus is the target value of the focus position.

12. The apparatus according to claim 11, wherein the processor is further configured to enable the focus to automatically vary continuously with a continuous variation in a focal length.

13. The apparatus according to claim 11, wherein the processor is further configured to determine whether the position of the photographed subject in the formed image is the first position.

14. The apparatus according to claim 11, wherein the processor is further configured to:
determine a photographing distance between the photographed subject and the image acquisition apparatus according to the current photographing focal length, the image size, and the photographing parameter-image data-photographing distance correspondence; and
determine the target value of the photographing focal length according to the preset image size, the photographing distance, and the photographing parameter-image data-photographing distance correspondence.

15. The apparatus according to claim 11, wherein the processor is further configured to adjust the current photographic focal length when a photographic distance is fixed to be a first object distance.

16. The apparatus according to claim 11, wherein the processor is further configured to adjust a photographic distance when the photographing focal length is fixed to be a first photographing focal length.

17. The apparatus according to claim 11, wherein the processor is further configured to determine the photographing parameter-image data-photographing distance correspondence.

18. The apparatus according to claim 11, wherein the processor is further configured to:
set an initial photographing focal length;
set an initial photographing distance; and
adjust the focus such that an image of the photographed subject is displayed clearly.

19. The apparatus according to claim 11, wherein the photographing focal length is updated when the photographing distance is not greater than the minimum photographing distance.

20. A method, comprising:
detecting, by an image acquisition apparatus, image data of a photographed subject following current photographing parameters, wherein the current photographing parameters comprise a photographing focal length, and wherein the image data comprises a position of the photographed subject in a formed image and an image size;
determining whether the position of the photographed subject in the formed image is a first position;
adjusting the image acquisition apparatus such that the position of the photographed subject in the formed image is the first position when the position of the photographed subject in the formed image is not the first position;
determining a target value of the photographing focal length based on a photographing parameter-image data-photographing distance correspondence and according to a current photographing focal length, the image data, and a preset image size;
adjusting the current photographing focal length of the image acquisition apparatus to the target value of the photographing focal length.

* * * * *